United States Patent
Endo et al.

(10) Patent No.: US 7,696,734 B2
(45) Date of Patent: Apr. 13, 2010

(54) MULTIPHASE DC-DC CONVERTER

(75) Inventors: Naoto Endo, Tama (JP); Hitoshi Shima, Atsugi (JP)

(73) Assignee: Mitsumi Electric Co., Ltd., Tama-Shi (JP)

( * ) Notice: Subject to any disclaimer, the term of this patent is extended or adjusted under 35 U.S.C. 154(b) by 308 days.

(21) Appl. No.: 11/998,139

(22) Filed: Nov. 28, 2007

(65) Prior Publication Data

US 2008/0129259 A1    Jun. 5, 2008

(30) Foreign Application Priority Data

Nov. 30, 2006    (JP)    ............................. 2006-322824

(51) Int. Cl.
G05F 1/59    (2006.01)
(52) U.S. Cl. ..................................... 323/272
(58) Field of Classification Search ................. 323/265, 323/268, 272, 275, 279, 282, 283
See application file for complete search history.

(56) References Cited

U.S. PATENT DOCUMENTS

| 6,995,548 | B2 * | 2/2006 | Walters et al. | 323/272 |
| 7,026,798 | B2 * | 4/2006 | Cheung et al. | 323/225 |
| 7,084,613 | B2 * | 8/2006 | Harris et al. | 323/272 |
| 7,161,337 | B2 * | 1/2007 | Nishimori | 323/271 |
| 7,301,400 | B1 * | 11/2007 | Dening | 330/276 |
| 7,479,772 | B2 * | 1/2009 | Zane et al. | 323/272 |

FOREIGN PATENT DOCUMENTS

| JP | 8-084465 A | 3/1996 |
| JP | 11-127573 A | 5/1999 |
| JP | 2003-284333 A | 10/2003 |

* cited by examiner

*Primary Examiner*—Adolf Berhane
(74) *Attorney, Agent, or Firm*—Frishauf, Holtz, Goodman & Chick, P.C.

(57) ABSTRACT

Disclosed is a multiphase DC-DC converter including a plurality of DC-DC converter circuits connected in parallel to one another; an output section to add up outputs of the plurality of DC-DC converter circuits to obtain one output; a timing generating circuit to generate timing signals for respectively operating the plurality of DC-DC converter circuits; a control circuit to selectively and sequentially operate the plurality of DC-DC converter circuits in synchronization with the timing signals outputted from the timing generating circuit so that output phases of the plurality of DC-DC converter circuits are different from one another; and a current detection circuit to detect an output current of each of the plurality of DC-DC converter circuits, wherein the control circuit selects one of the plurality of DC-DC converter circuit to be operated next based on an output of the current detection circuit.

10 Claims, 11 Drawing Sheets

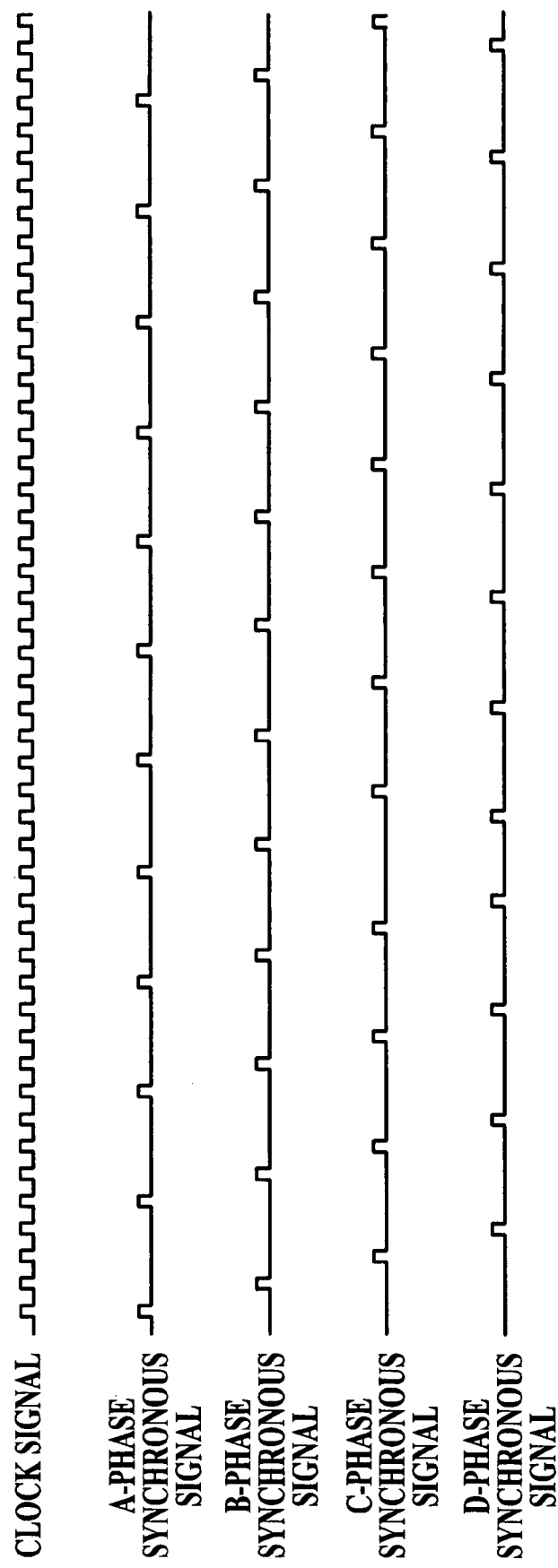

DISTRIBUTION OF CLOCK SIGNAL

VARIATION OF OUTPUT CURRENT OF A-PHASE

VARIATION OF OUTPUT CURRENT OF C-PHASE

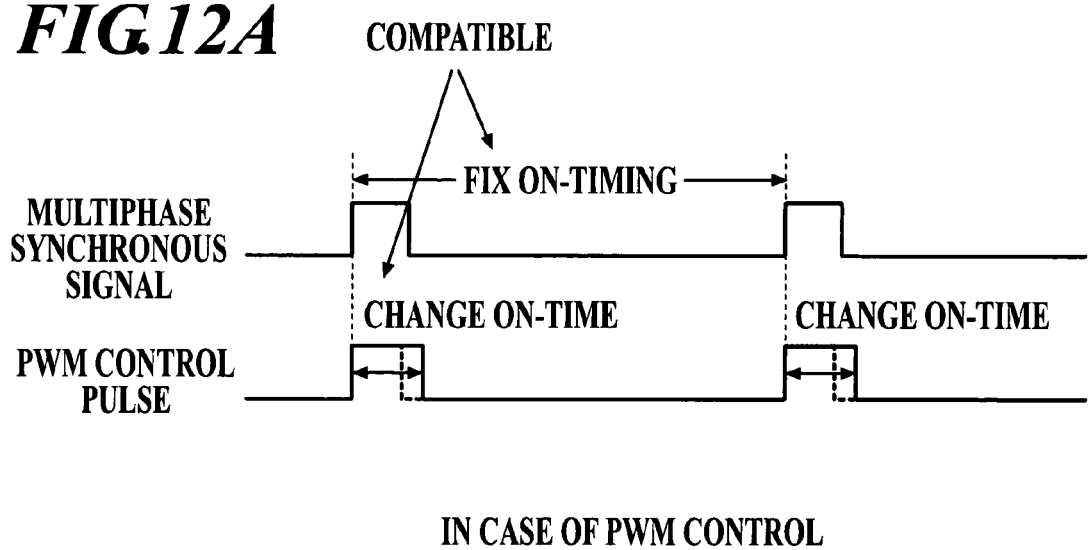
IN CASE OF PWM CONTROL
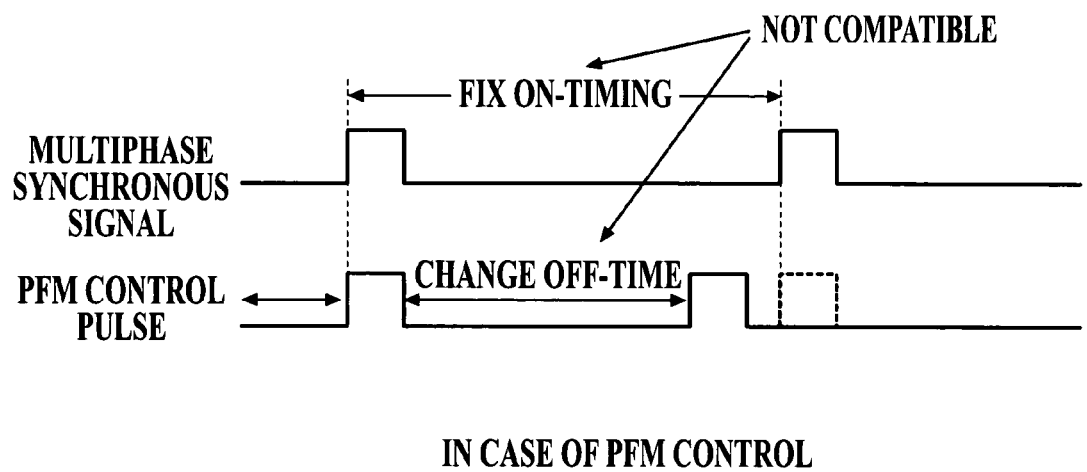
IN CASE OF PFM CONTROL

MULTIPHASE DC-DC CONVERTER

BACKGROUND OF THE INVENTION

1. Field of the Invention

The present invention relates to a multiphase DC-DC converter, and more particularly, to a useful technique which is applied to a multiphase DC-DC converter using a PFM (Pulse Frequency Modulation)-controlled DC-DC converter circuit.

2. Description of Related Art

There has been known a DC-DC converter of a multiphase system in which a plurality of DC-DC converter circuits are arranged in parallel and operated so that output phases of the respective DC-DC converter circuits are shifted to each other, and the respective outputs thereof are added up to obtain one output. According to such a multiphase DC-DC converter, a large output having a low ripple as a whole can be obtained.

Japanese Patent Application Laid-Open Publication No. 2003-284333 discloses a DC-DC converter of a multiphase system in which PWM (Pulse Width Modulation)-controlled DC-DC converter circuits are arranged in parallel. Japanese Patent Application Laid-Open Publication No. H11-127573 and Japanese Patent Application Laid-Open Publication No. H8-84465 disclose a power supply circuit in which a plurality of DC-DC converter circuits are arranged in parallel although they are not based on the multiphase control system.

In the multiphase system, since the respective DC-DC converter circuits are operated so that the output phases thereof are shifted to each other, the multiphase system can easily be applicable to PWM (Pulse Width Modulation)-controlled DC-DC converter circuits, but it is difficult to apply the multiphase system to PFM (Pulse Frequency Modulation)-controlled DC-DC converter circuits.

To put it concretely, the PWM control is compatible with the multiphase system by changing the pulse width of a driving pulse without changing a period of the driving pulse in order to vary the outputs of the DC-DC converter circuits as shown in FIG. 12A. Accordingly, since a plurality of DC-DC converter circuits are respectively operated at different predetermined operation timing while shifting the operation timing by a predetermined phase angle, it is possible to adjust the outputs of the plurality of DC-DC converter circuits individually.

On the other hand, under the PFM control of FIG. 12B, there is a need to change frequency of the driving pulse in order to vary the outputs of the DC-DC converter circuits. Therefore, when adjusting outputs of a plurality of DC-DC converter circuits individually, the PFM control is not compatible with an operation of the multiphase system in which the plurality of DC-DC converter circuits are respectively operated at different predetermined operation timing while shifting the operation timing by a predetermined phase angle.

Even in the case of PFM control, a plurality of DC-DC converter circuits may have the same configuration as each other by using identical circuit elements for all of the converter circuits so that equal outputs are obtained from the respective converter circuits when operating the circuits at the same frequency. Such an ideal operation, however, cannot be obtained in the actual circuits. That is, since there is characteristic dispersion among the respective circuit elements, the output voltages of the respective converter circuits would be different from one another if they are operated at the same operation frequency. Furthermore, in the operation of the multiphase system, because the outputs of the respective converter circuits are directly connected to one another, slight differences among the output voltages can be appeared as large differences in output currents.

For example, as shown in FIG. 13, when a current of 100A is outputted by adding up the outputs of four DC-DC converter circuits, slight characteristic dispersion of the circuit elements appears as large output dispersion such as 10A to 40A unless the outputs of the respective DC-DC converter circuits are adjusted individually. Furthermore, there may occur such a situation that an output of one DC-DC converter circuit is excessively large while a current of another DC-DC converter circuit flows back.

SUMMARY OF THE INVENTION

It is, therefore, a main object of the present invention to provide a DC-DC converter of a multiphase system in which output adjustment of each of a plurality of DC-DC converter circuits can easily be compatible with operation control of the multiphase system irrespective of a type of control systems of the respective DC-DC converter circuits.

According to one aspect of the present invention, there is provided a multiphase DC-DC converter including a plurality of DC-DC converter circuits connected in parallel to one another;

an output section to add up outputs of the plurality of DC-DC converter circuits to obtain one output;

a timing generating circuit to generate timing signals for respectively operating the plurality of DC-DC converter circuits;

a control circuit to selectively and sequentially operate the plurality of DC-DC converter circuits in synchronization with the timing signals outputted from the timing generating circuit so that output phases of the plurality of DC-DC converter circuits are different from one another; and a current detection circuit to detect an output current of each of the plurality of DC-DC converter circuits, wherein the control circuit selects one of the plurality of DC-DC converter circuit to be operated next based on an output of the current detection circuit.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 6 is a waveform diagram showing the clock signal and the synchronous signals of FIG. 4 when the distribution of the clock signal is close to actual situation;

FIG. 12A is a waveform diagram when a multiphase method is applied to a PWM-controlled DC-DC converter circuit;

FIG. 12B is a waveform diagram when a multiphase method is applied to a PFM-controlled DC-DC converter circuit, and shows difficulty of compatibility between the multiphase method and the PFM control.

DESCRIPTION OF THE PREFERRED EMBODIMENTS

Hereinafter, preferred embodiments of the present invention will be described with reference to the drawings.

Figure 1:
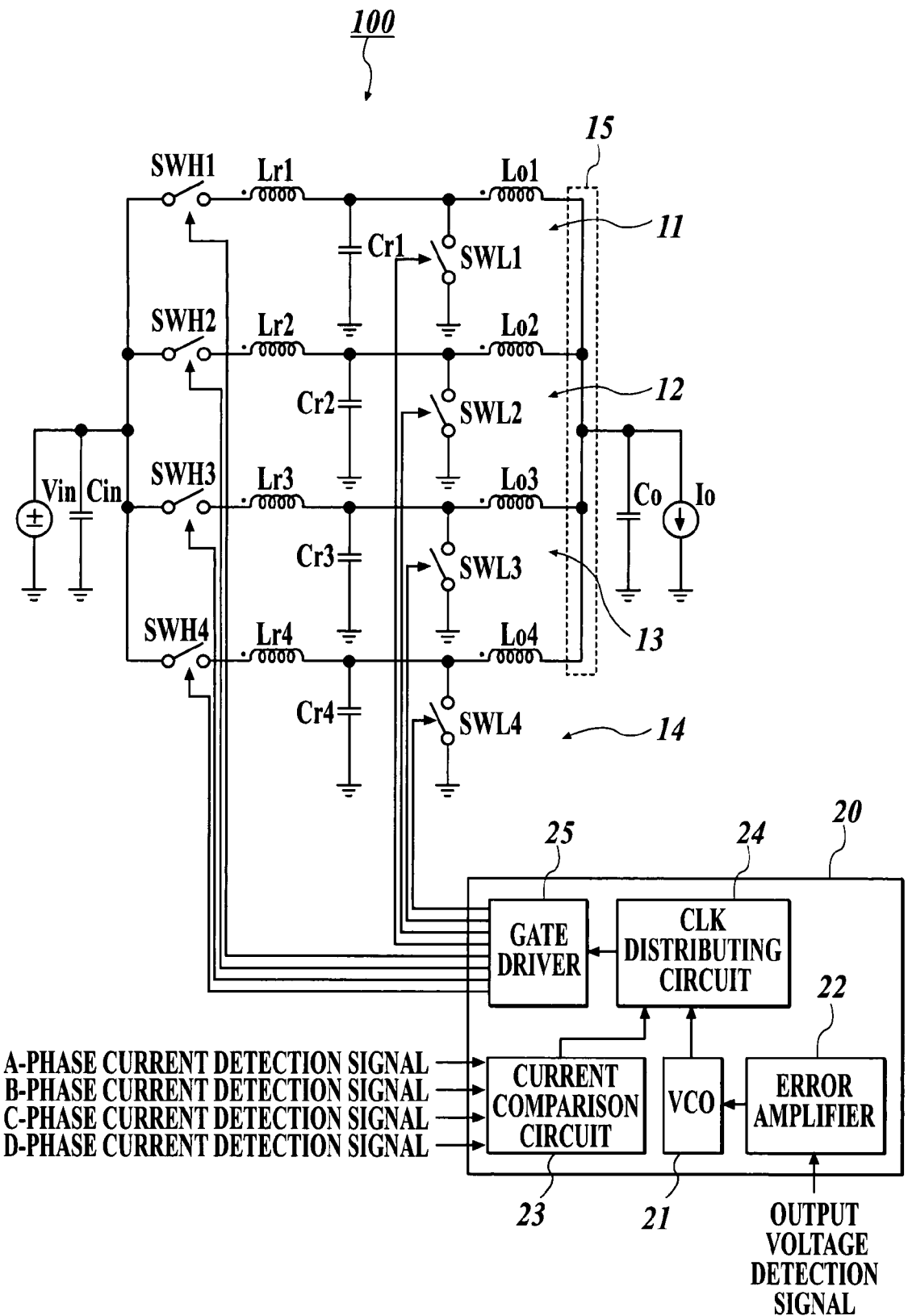
FIG. 1 is a configuration diagram showing a multiphase DC-DC converter according to a preferred embodiment of the present invention.
Figure 2:
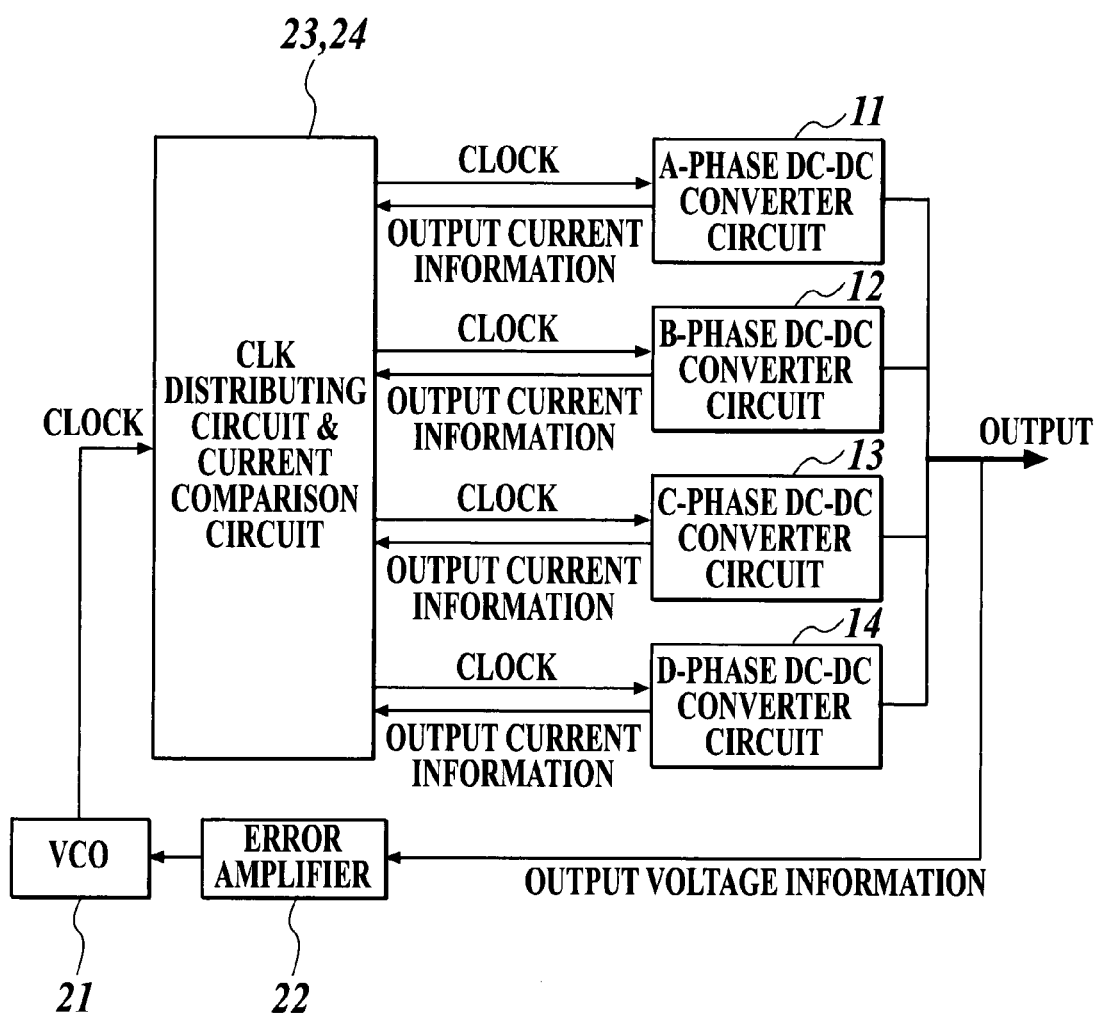
FIG. 2 is an explanatory diagram showing an overview of a control system configuration of the multiphase DC-DC converter of FIG. 1.

FIG. 1 is a configuration diagram showing a multiphase DC-DC converter according to a preferred embodiment of the present invention, and FIG. 2 is an explanatory diagram showing an overview of a control system configuration of the multiphase DC-DC converter.

A multiphase DC-DC converter 100 according to the embodiment includes a plurality of DC-DC converter circuits 11 to 14 arranged in parallel. The respective DC-DC converter circuits are operated so that output phases thereof are shifted to one another, and the respective outputs are added up to obtain one output. The plurality of DC-DC converter circuits 11 to 14 are successively denoted by A-phase to D-phase from the top.

Figure 3A:
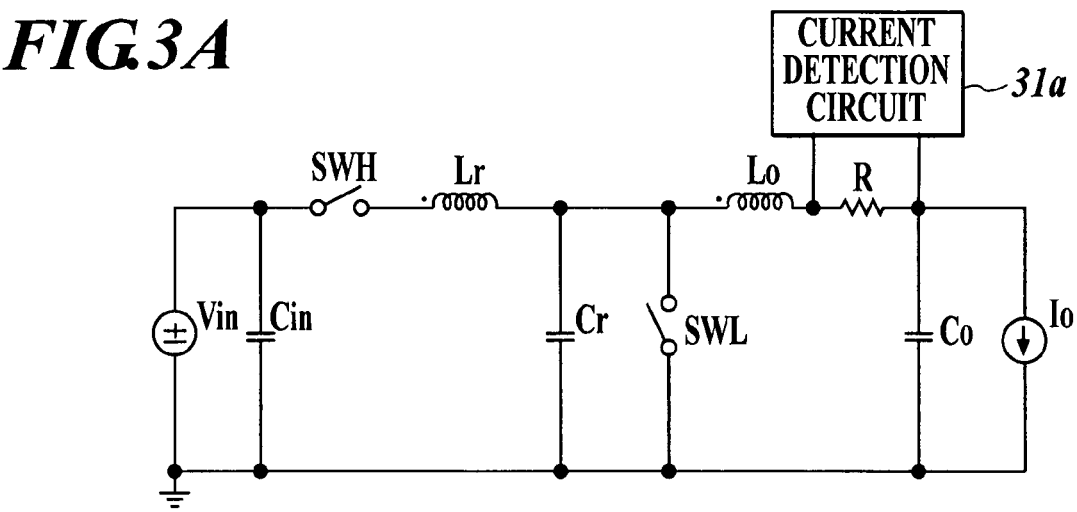
FIG. 3A is an explanatory diagram showing a current detecting method for detecting output current based on a voltage of a detecting resistor which is connected to a current passage.
Figure 3B:
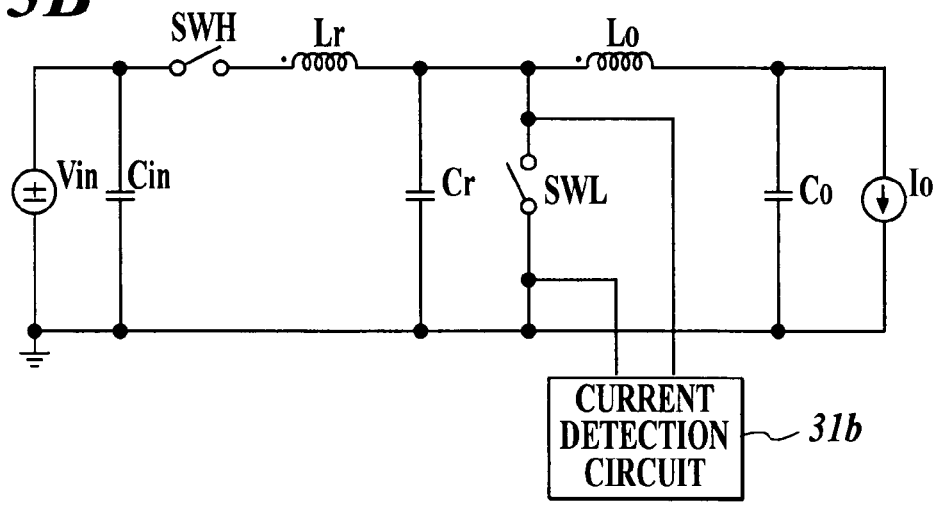
FIG. 3B is an explanatory diagram showing a current detection method for detecting output current based on a voltage of a synchronous rectification switch during the period when the synchronous rectification switch is on using ON-resistance of the synchronous rectification switch.
Figure 3C:
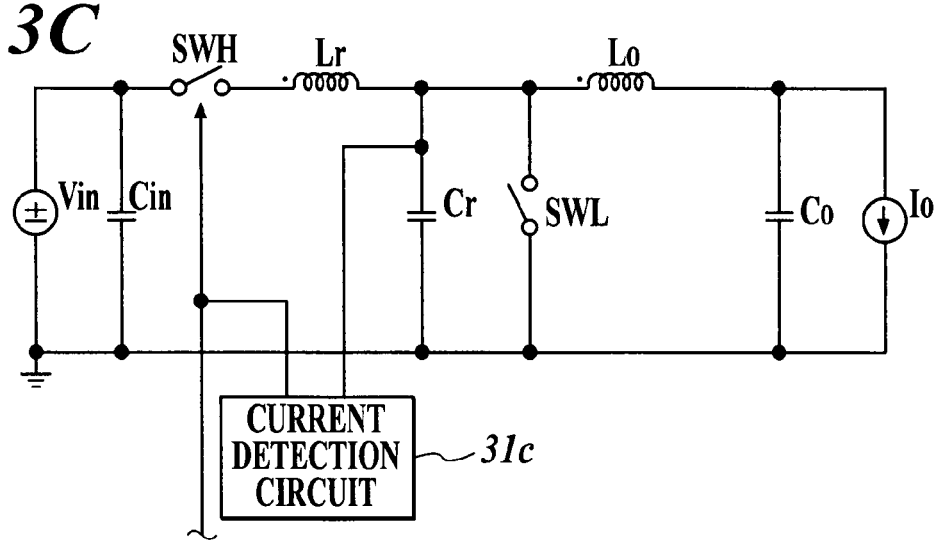
FIG. 3C is an explanatory diagram showing a current detection method for detecting output current based on delay time from switching timing till a resonance operation of a resonance circuit is started.

The multiphase DC-DC converter 100 includes the DC-DC converter circuits 11 to 14 of A-phase to D-phase, a control block 20 to control the operation of these converter circuits, one or more current detection circuits (31a to 31c: FIGS. 3A to 3C) (not shown in FIG. 1) to detect output currents of the respective DC-DC converter circuits 11 to 14, an output section 15 to add up outputs of the DC-DC converter circuits 11 to 14 to obtain one output, and a voltage detection circuit to detect an output voltage of the total output.

The DC-DC converter circuit 11 of A-phase is a step-down type switching converter using a current resonance switch. The DC-DC converter circuit 11 includes an input capacitor Cin which is common to the A-phase to the D-phase, a switching element SWH1 for inputting an input voltage Vin to the inside of the DC-DC converter circuit 11, a resonant inductor Lr1 and a resonant capacitor Cr1 for oscillating current flowing through the switching element SWH1 in the form of a sine wave, a reactor Lo1 for receiving the input voltage Vin and charging the electric power, a synchronous rectification switch SWL1 for supplying current to the reactor Lo1 when the switching element SWH1 is off, and an output capacitor Co, which is common to the A-phase to the D-phase, connected between output terminals, etc.

The switching element SWH1 and the synchronous rectifying switch SWL1 may be composed of a MOSFET (Metal-Oxide-Semiconductor Field Effect Transistor) or the like, however, they may be composed of the other transistors such as a bipolar transistor, etc.

The DC-DC converter circuits 12 to 14 of the B-phase to the D-phase are designed to have the same circuit configuration using the same circuit elements as the DC-DC converter circuit 11 of the A-phase.

The control block 20 includes a VCO (Voltage-Controlled Oscillator) 21 for generating respective operation timing of the DC-DC converter circuits 11 to 14, an error amplifier 22 for receiving a voltage detection signal of a total output and comparing the voltage detection signal with a reference voltage, a current comparison circuit 23 for comparing the output currents of the DC-DC converter circuits 11 to 14 of the A-phase to the D-phase, a clock distributing circuit 24 for distributing a clock signal (a timing signal) of the VCO 21 so that the DC-DC converter circuit selected on the basis of the current comparison is operated, and a gate driver 25 for synchronizing the DC-DC converter circuit, to which the clock signal is distributed, with the clock signal to carry out a switching operation, etc.

In the current resonance type switching converter, the ON-period of the switching elements SWH1 to SWH4 is substantially fixed to one period or a half period of the resonating operation of the LC resonance circuit (Lr1 to Lr4, Cr1 to Cr4), and thus output control is basically PFM control. The switching frequency of the overall circuit is controlled by the error amplifier 22 and the VCO 21, and the oscillation frequency of the VCO 21 is controlled to increase when the output voltage of the total output decreases and conversely decrease when the output voltage increases, whereby the output voltage can be kept constant.

According to a predetermined algorithm, the current comparison circuit 23 and the clock distributing circuit 24 sort (select) destinations to which the clock signal is to be supplied so that the output currents of the DC-DC converter circuits 11 to 14 of the A-phase to the D-phase are equal. The destination to which the clock signal is to be supplied is the DC-DC converter circuit of any one phase of the A-phase to the D-phase, and the sorting of the destinations is carried out every one clock. Furthermore, the detection signals representing the output current amounts of the A-phase to the D-phase are inputted to the current comparison circuit 23. These detection signals may represent the real-time output current amounts of the respective DC-DC converter circuits 11 to 14 or represent the output current amounts at a specific timing.

By distributing the clock as described above, a larger amount of clock signal is supplied to a DC-DC converter circuit whose output is liable to decrease depending on variation in characteristics of the circuit elements, and a smaller amount of clock signal is supplied to a DC-DC converter circuit whose output is liable to increase, whereby the output currents of the DC-DC converter circuits 11 to 14 can be equalized.

FIGS. 3A to 3C are diagrams showing variation of the current detection method.

Various configurations may be applied to the current detection circuits.

For example, as shown in FIG. 3A, a current detection circuit 31a for detecting output current based on a voltage of a detecting resistor R which is connected to a current passage may be applied. According to the current detection circuit 31a, although there is a disadvantage that a loss occurs in the detecting resistor R, there is an advantage that the output current of each of the DC-DC converter circuits 11 to 14 can be detected on a real-time basis at all times.

Furthermore, as shown in FIG. 3B, a current detection circuit 31b for detecting output current based on a voltage of the synchronous rectification switch SWL during the period when the synchronous rectification switch SWL is ON using ON-resistance of the synchronous rectification switch SWL can be used. According to the current detection circuit 31b, although there is a disadvantage that it is difficult to perform high-precision current detection because the ON-resistance of the synchronous rectification switch SWL is very small and the temperature characteristic of the switch SWL is relatively large, and also a disadvantage that the current detection during a predetermined period such as the ON-period of the switching element SWH is interrupted, there is an advantage that the current can be detected without increasing the number of circuit elements and the conduction loss.

Furthermore, in the current resonance type switching converter, as shown in FIG. 3C, a current detection output circuit 31c for detecting output current based on delay time from switching timing till a resonance operation of a resonance circuit is started may be applied. The current resonance type switching converter has the property that the delay time concerned is dependent on the output current amount. Therefore, the ON-timing of the switching element SWH and the timing at which the capacitor voltage of the resonance capacitor Cr exceeds a threshold voltage are detected, and the output current can be detected based on the period between these timings.

According to the current detection circuit 31c, although there is a disadvantage that the current detection can be performed only at the timing at which the DC-DC converter circuit is subjected to the switching operation, there is an advantage that the current detection of the DC-DC converter circuits 11 to 14 of the A-phase to the D-phase can be commonly performed by using one current detection circuit 31c. Additionally, there is an advantage that the current detection can be accurately performed with little temperature dependency.

Next, the operation of the multiphase DC-DC converter 100 will be described.

Figure 4:
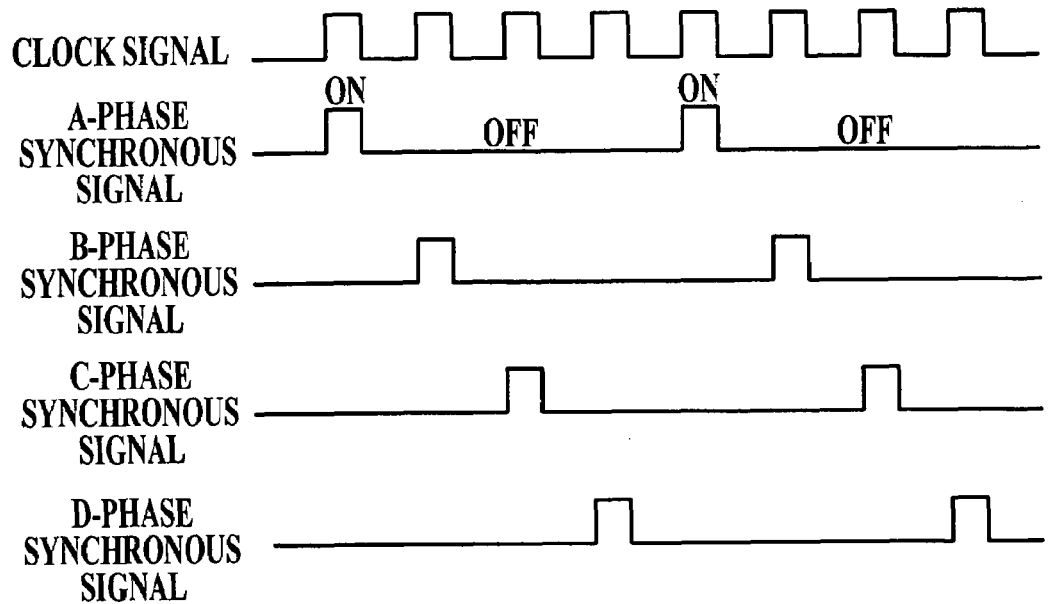
FIG. 4 is a waveform diagram showing a clock signal supplied from VCO and synchronous signals distributed by a clock distributing circuit when output differences among respective phases of the signals are small.
Figure 5:
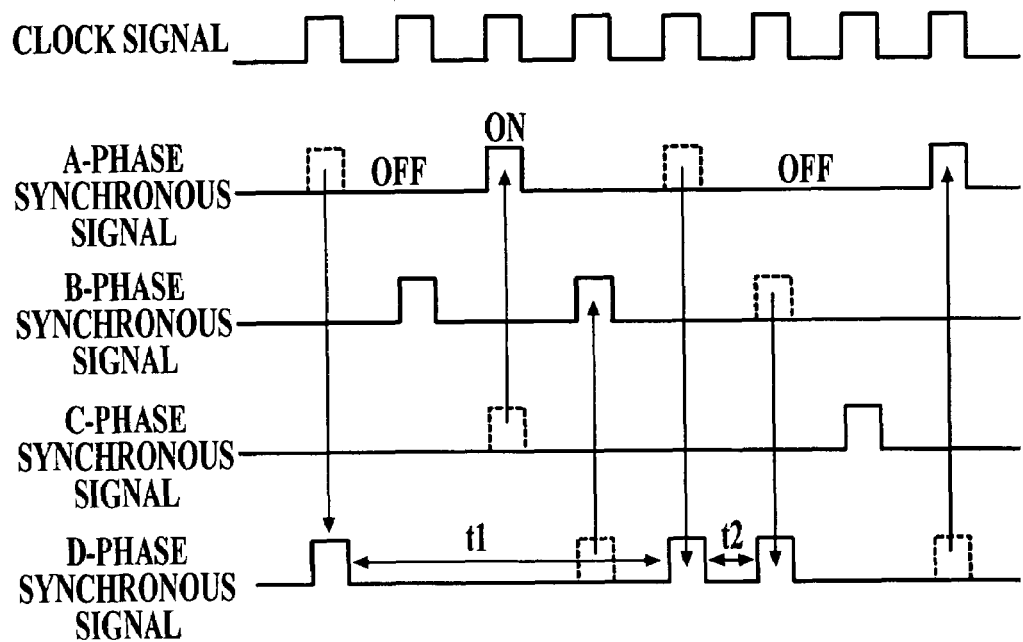
FIG. 5 is a waveform diagram showing the clock signal and the synchronous signals of FIG. 4 when the distribution of the clock signal varies based on the output differences among respective phases.

FIGS. 4 to 6 are waveform diagrams showing a clock signal outputted from the VCO 21, and synchronous signals distributed from the clock distributing circuit 24 to the DC-DC converter circuits 11 to 14 of the A-phase and the D-phase.

When the multiphase DC-DC converter 100 is in a normal state, the clock signal generated by the VCO 21 is successively distributed to each of the DC-DC converter circuits 11 to 14 of the A-phase to the D-phase one by one as shown in FIG. 4. In the DC-DC converter circuits 11 to 14 of the A-phase to the D-phase, the switching elements SWH1 to SWH4 at the high side and the synchronous rectification switches SWL1 to SWL4 at the low side are turned on/off and operated based on the distributed synchronous signals.

When differences in output currents among the respective phases occur, the distribution of the clock signal by the clock distributing circuit 24 is not based on the order from the A-phase to the D-phase, but is changed so that a larger amount of synchronous signal is distributed to a DC-DC converter circuit having a small output and a smaller amount of synchronous signal is distributed to a DC-DC converter circuit having a larger output as shown in FIG. 5. An algorithm for this distribution will be described later.

In the actual circuit, the change of the distribution of the clock signal is not so frequently occurred as shown in FIG. 5, but is occurred over a long term as shown in FIG. 6.

Figure 7A:
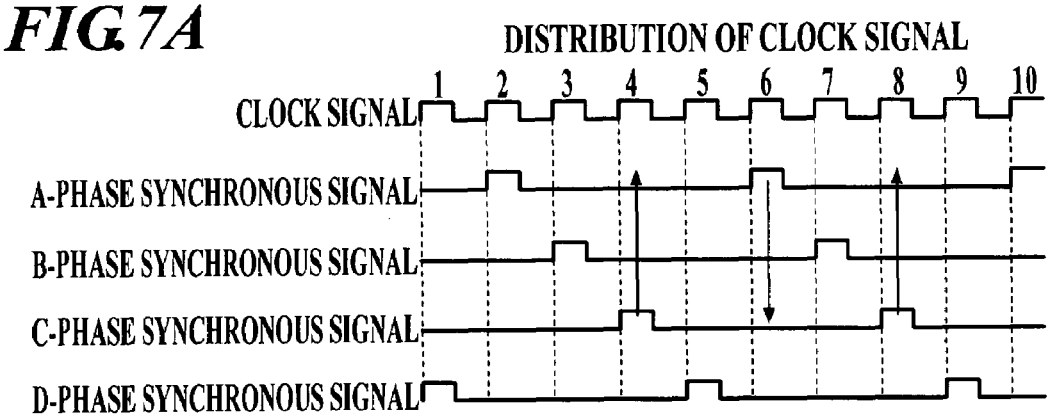
FIG. 7A is a waveform diagram showing the distribution of the clock signal.
Figure 7B:
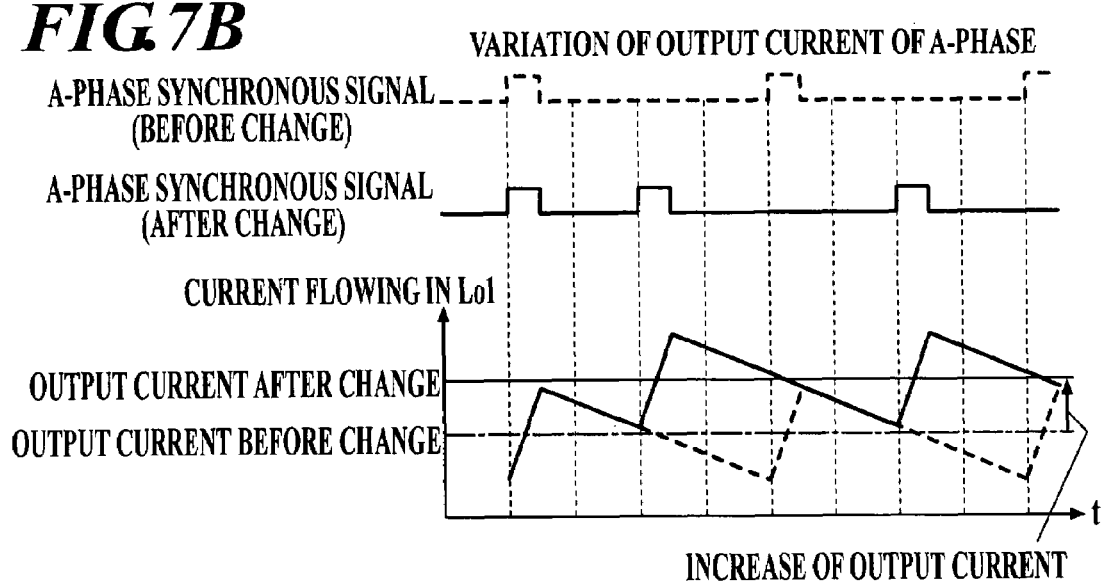
FIG. 7B is a waveform diagram showing variation of output current of A-phase based on the distribution of the clock signal.
Figure 7C:
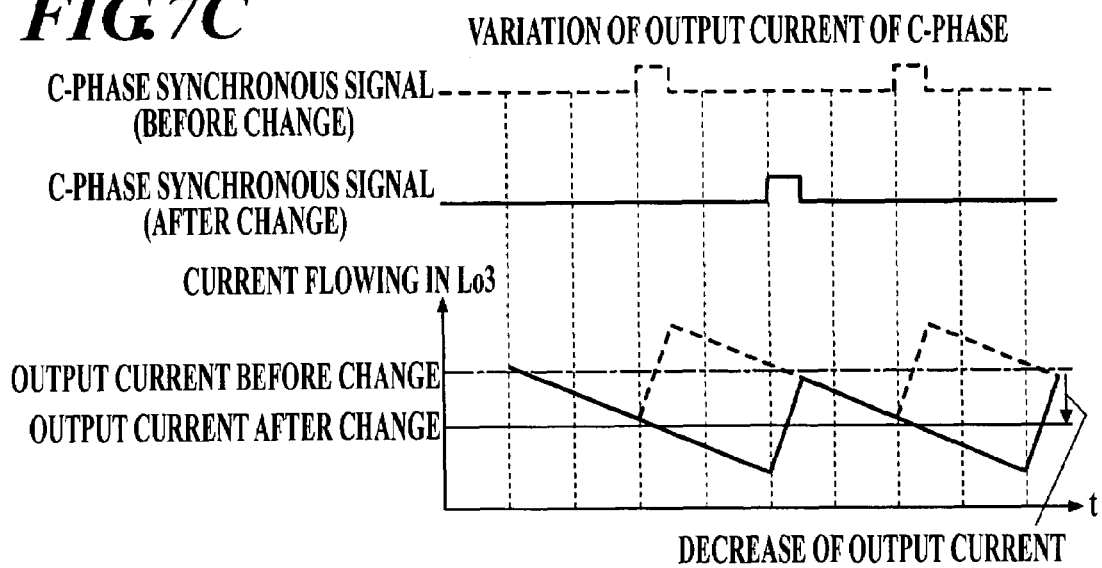
FIG. 7C is a waveform diagram showing variation of output current of C-phase based on the distribution of the clock signal.
Figure 8:
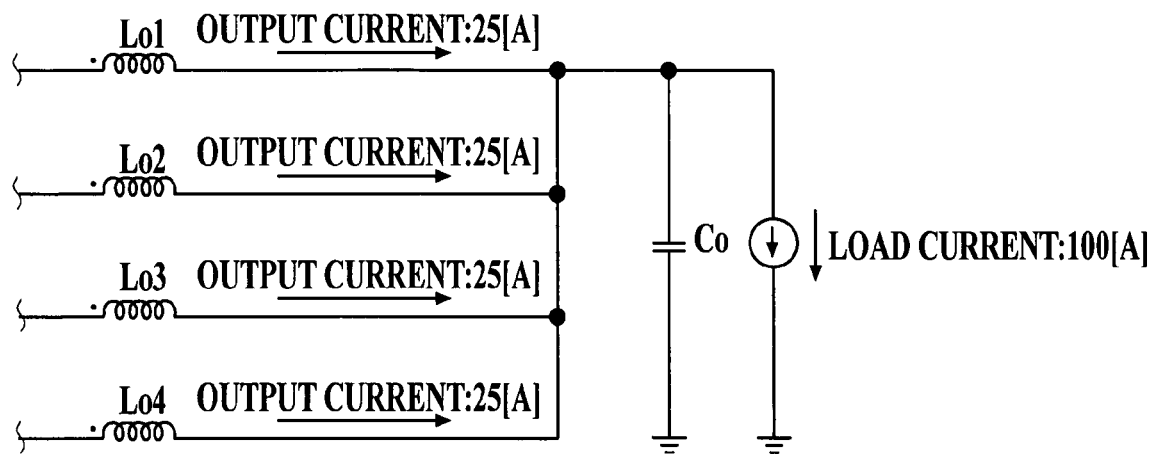
FIG. 8 is an explanatory diagram showing an output state of each phase which is established by the distribution of the clock signal.

FIGS. 7A to 7C are waveform diagrams showing variation of the output current of each phase due to the distribution of the clock signal, and FIG. 8 is an explanatory diagram showing an output state of each phase which is attained by the distribution of the clock signal.

For example, assume that the clock distributing circuit 24 changes the fourth and eighth clock signals to the synchronous signal of the A-phase and also changes the sixth clock signal to the synchronous signal of the C-phase as shown in FIG. 7A. When such distribution is carried out, since frequency of the switching operation is increased in the DC-DC converter circuit 11 of the A-phase, an average value of output current flowing in the reactor Lo1 is increased as compared with the normal distribution case (represented by a dashed line) as shown in FIG. 7B.

Furthermore, as shown in FIG. 7C, since the frequency of the switching operation is reduced in the DC-DC converter circuit 13 of the C-phase, an average value of output current flowing in the reactor Lo3 is reduced as compared with the normal distribution case (represented by a dashed line).

Since the distribution of the clock signal as described above is carried out so that the differences in the output currents among the respective phases are reduced, the output currents of the respective phases are controlled to be substantially equal to one another as shown in FIG. 8.

Figure 9:
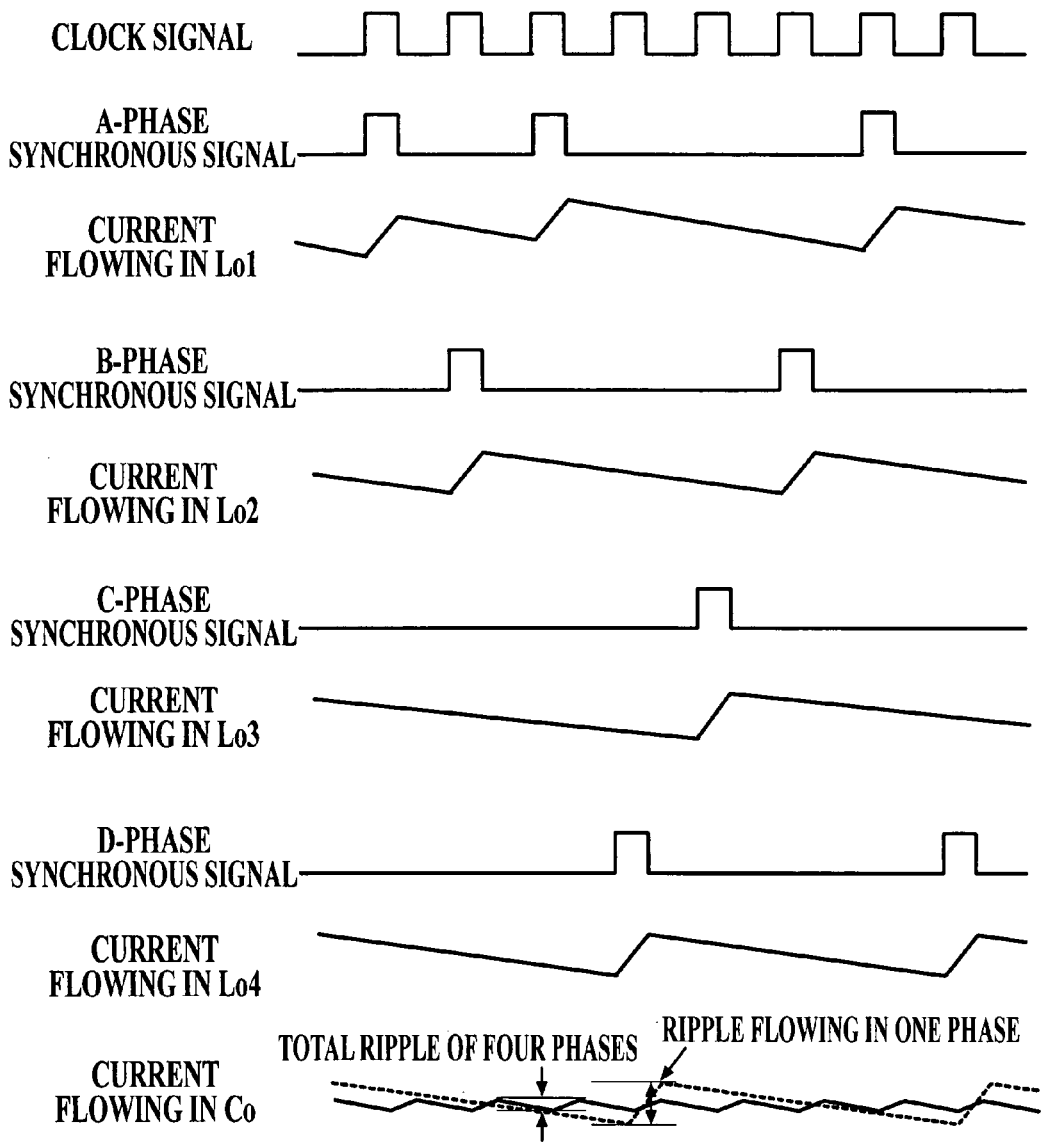
FIG. 9 is a waveform diagram showing outputs of respective phases and the total output of these outputs when the distribution of the clock signal varies.

FIG. 9 is a waveform diagram showing the outputs of the respective phases and the total output thereof when the distribution of the clock signal is changed.

Even if the distribution of the clock signal is not carried out in order as described above, one of the DC-DC converter circuits is subjected to the switching operation corresponding to one clock signal outputted from the VCO 21 as shown in FIG. 9. Therefore, a ripple of the total output is averaged and reduced as in a circuit of a normal multiphase method.

Next, a method of distributing the clock signal by the clock distributing circuit 24 will be described. The clock distributing circuit 24 implements the following algorithm by hardware processing based on the combination of an analog circuit such as a voltage comparator and a logic circuit.

Figure 10:
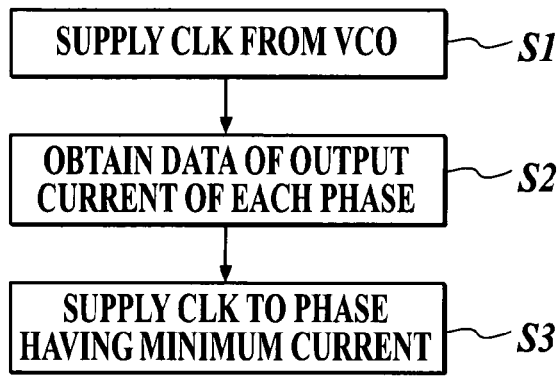
FIG. 10 is a flowchart showing a first example of a clock signal distributing process executed by a clock distributing circuit.

FIG. 10 is a flowchart showing a first example of the distribution procedure of the clock signal by the clock distributing circuit 24.

In the distribution algorithm of the first example, every time the clock signal is supplied from the VCO 21 (step S1), real-time output current information is obtained from the DC-DC converter circuits 11 to 14 of all the phases at that timing (step S2). These output currents are compared with one another and then the clock signal is outputted to the DC-DC converter circuit of the phase whose output current is smallest (step S3).

With respect to the currents of the reactors Lo1 to Lo4 of the DC-DC converter circuits 11 to 14, the current values have been increased during the period when the clock signal is supplied and thus the high-side switching elements SWH1 to SWH2 are on, and also the current values have been gradually reduced during the period when the high-side switching elements SWH1 to SWH4 are off as shown in FIG. 9.

Therefore, according to the distributing method as described above, the clock signal is successively distributed to each of the DC-DC converter circuits 11 to 14 of the A-phase to the D-phase in order during most of the period, while this distribution order is changed at a very longer period than the clock period so that the clock-signal distribution order of a DC-DC converter circuit having a smaller output current is shifted to an earlier order (that is, the clock signal is supplied to the DC-DC converter circuit concerned more early in the order) and the clock-signal distribution order of a DC-DC converter circuit having a larger output current is shifted to a later order (that is, the clock signal is supplied to the DC-DC converter circuit concerned later in the order), whereby the distribution order is controlled such that the differences in output current among the respective phases are reduced.

This distribution method can be applicable to a current detection circuit in which the current detection can be performed at any timing and delay time taken for the current detection or the current comparison is shorter than the period of the clock signal as in the case of the current detection circuit 31a of FIG. 3A.

Figure 11:
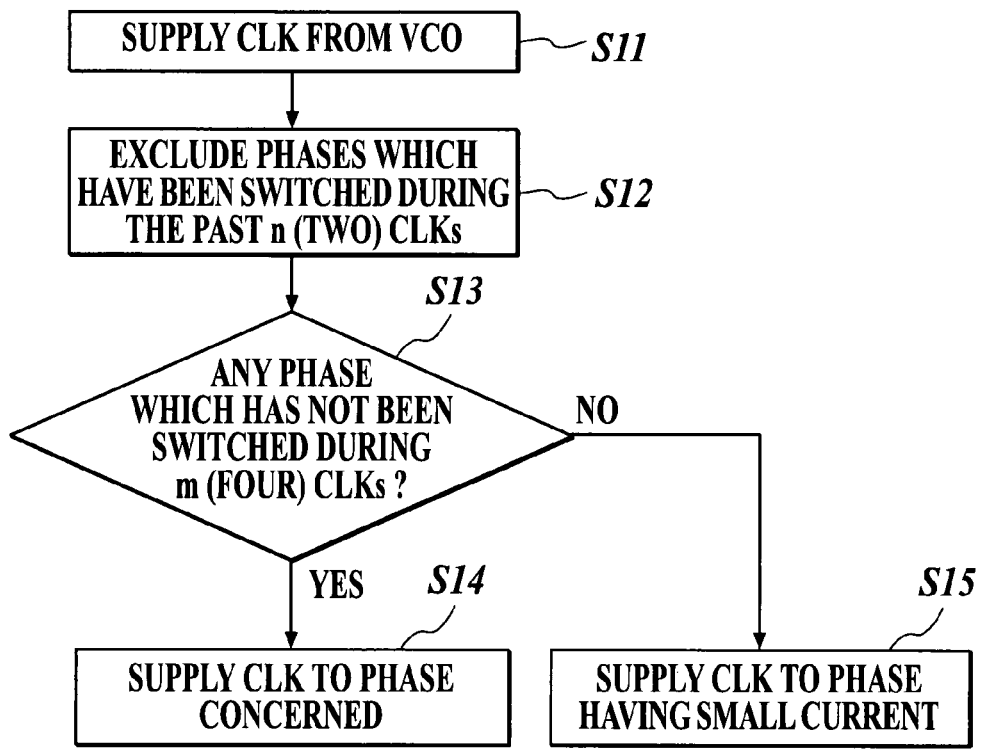
FIG. 11 is a flowchart showing a second example of a clock signal distributing process executed by a clock distributing circuit.
Figure 13:
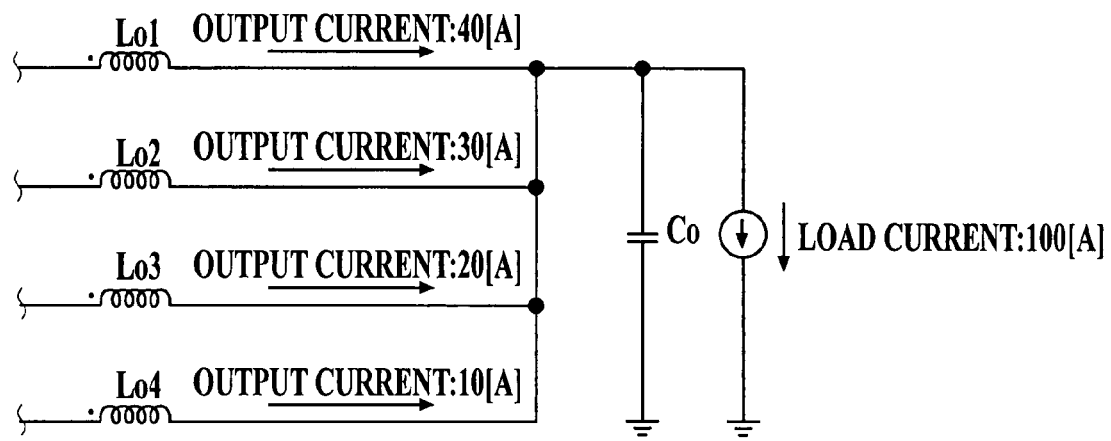
FIG. 13 is an explanatory diagram showing an output example when an output adjustment of each phase is not carried out in a circuit which is based on the multiphase method.

FIG. 11 is a flowchart of a second example of the distribution procedure of the clock signal by the clock distributing circuit 24.

A distributing algorithm of the second example is the same as that of the first example in that a distribution destination of a clock signal is determined and the clock signal is distributed every time the clock signal is supplied from the VCO 21, but is different from the first example in that how the distribution destination of the clock signal is determined.

In the second example, one or more phases (A-phase to D-phase) to which clock signals have been distributed during the most recent n clock signals (for example, two clock signals) are first excluded from the next distribution destination (step S12). Then, it is checked whether there is a phase to which no clock signal has been distributed during m clock signals (for example, 4 clock signals) or not (step S13). If the corresponding phase exists in step S13, a clock signal is preferentially supplied to this phase (step S14).

On the other hand, if there is no phase to which no clock signal has been distributed during m clock signals in step S13, a clock signal is distributed to a phase whose output current is the lowest detection value while excluding the phases to which most recent n clocks have been distributed (step S15).

Here, a value of n in step S12 may be properly set in a range of smaller than the number of the DC-DC converter circuits 11 to 14 which are operated so that output phases thereof are different from one another.

A value of m in step S13 may be properly set in a range of no less than the number of the DC-DC converter circuits 11 to 14 which are operated so that output phases thereof are different from one another.

According to the distributing method as described above, the distribution destinations of the clock signals are properly dispersed, and the outputs of the DC-DC converter circuits 11 to 14 of the A-phase to the D-phase are adjusted, and thereby output differences among the respective phases are reduced.

As shown in FIG. 5, by properly setting the value of n and the value of m, it is possible to restrict a longest period t1 for which no clock signal is distributed and a shortest period t2 of adjacent clock signals so that the outputs of the respective phases do not sharply vary, but vary moderately to maintain balance of the outputs even when the distribution order of the clock signals is variously rearranged (changed).

This distributing method may be applied to various types of current detecting circuits as shown in FIGS. 3A to 3C. For example, the current detection of each phase is not necessarily carried out on a real-time basis. Even a circuit which needs to delay about one period of a clock signal till the current is detected can be applied. In this case, since one or more phases which have been subjected to switching operation for a period of the most recent n clock signals are excluded from the distribution destinations of the clock signals, it is possible to accurately compare the outputs of the respective phases with one another irrespective of the delay of the current detection. That is, it is possible to avoid such a disadvantage that a distribution destination of a clock signal is determined based on a detection signal in the case of low output even when the switching operation is carried out and thus the output is increased.

This distributing method may no doubt be applied to even a current detection circuit which cannot perform current detection unless the switching operation is not carried out as shown in FIG. 3C. That is, since the period for which no clock signal is distributed is restricted by setting the value of m, even when the current detection is carried out when the output of the A-phase is high and then the state that the detection currents of the other phases do not exceed the previously detected current value of the A-phase because a total output of all phases is lowered is continued, the switching operation is carried out in all the phases again at least once for a period of m clock signals. Therefore, it is possible to avoid such a disadvantage that a clock signal is not distributed at all to only one phase.

As described above, according to the multiphase DC-DC converter 100 of this embodiment, the operation of a multiphase system can be carried out by using the current resonance type DC-DC converter circuits 11 to 14 operated under the PFM control, and the output currents of the respective DC-DC converter circuits 11 to 14 can be adjusted so that they are equal to one another.

Furthermore, since the operation control of the multiphase system can be performed in the resonance type DC-DC converter circuit, there can be obtained both an advantage of resonance type that the switching loss and the switching noise are reduced and an advantage of the multiphase system that a large output having a low ripple can be stably obtained. This makes it possible to enhance efficiency of a power supply device.

The present invention is not limited to the above embodiments, and various changes may be made. For example, a voltage resonance type converter circuit as well as a current resonance type converter circuit can be used as a DC-DC converter circuit. Moreover, a general PFM type converter circuit as well as the resonance type converter circuit can be used. Furthermore, not only the PFM-controlled converter circuit, but also a PWM-controlled DC-DC converter circuit can be used. Accordingly, it is possible to apply a converter circuit of the multiphase system of the present invention to even a DC-DC converter circuit which is operated so that PWM control and PFM control are switched to each other in accordance with output thereof.

Furthermore, not only a non-insulating type and step-down type switching converter as described in the above embodiments, but also an insulating type and step-up or step-up-and-down type switching converter may be used as the DC-DC converter circuit. Furthermore, an AC/DC converter may be realized by providing a rectifying circuit at an input stage thereof.

The details of the above embodiments which are specifically described, such as the number of the DC-DC converter circuits to be connected in parallel (the number of phases), the specific circuit configuration of the DC-DC converter circuit and the current detecting circuit, the algorithm for distributing the clock signal, etc., may be properly changed without departing from the scope of the present invention.

According to an embodiment of the present invention, there is provided a multiphase DC-DC converter including a plurality of DC-DC converter circuits connected in parallel to one another; an output section to add up outputs of the plurality of DC-DC converter circuits to obtain one output; a timing generating circuit to generate timing signals for respectively operating the plurality of DC-DC converter circuits; a control circuit to selectively and sequentially operate the plurality of DC-DC converter circuits in synchronization with the timing signals outputted from the timing generating circuit so that output phases of the plurality of DC-DC converter circuits are different from one another; and a current detection circuit to detect an output current of each of the plurality of DC-DC converter circuits, wherein the control circuit selects one of the plurality of DC-DC converter circuit to be operated next based on an output of the current detection circuit.

Preferably, the control circuit selects one of the plurality of DC-DC converter circuits to be operated next so that differences in output currents among the plurality of DC-DC converter circuits are reduced.

To be more precise, the control circuit may operate a DC-DC converter circuit having a smallest output current of the plurality of DC-DC converter circuits in synchronization with the next timing signal.

According to this method, it is possible to adjust the outputs of the plurality of DC-DC converter circuits so that they are equal to one another, and to carry out operation control of the multiphase system irrespective of a type of control systems of the respective DC-DC converter circuits (i.e. whether the control systems of the respective DC-DC converter circuit are based on PWM or PFM). Since the each of the DC-DC converter circuit is operated in synchronization with the timing signal generated by the timing generating circuit, the output phases of the plurality of DC-DC converter circuits are different from one another, and an advantage of the multiphase system such as reduction of ripple cannot be reduced.

Preferably, the control circuit selects one DC-DC converter circuit having a smallest output current, as a DC-DC converter circuit to be operated next, of the plurality of DC-DC converter circuits except for one or more DC-DC converter circuits which have been operated during the past n timing signals (n is a natural number smaller than the number of the plurality of DC-DC converter circuits).

This configuration makes it possible to adjust the outputs of the respective DC-DC converter circuits without problems even when a delay occurs in the current detection. That is, when the current detection is delayed by the amount corresponding to one or two timing signals, the output current is detected to be low. Therefore, the DC-DC converter circuit of the A-phase is operated once, and even after the output increases, a delay occurs until the increase of the output concerned is detected, and thus the DC-DC converter circuit concerned may be operated continuously twice or three times. This obstructs averaging of the outputs of the respective DC-DC converter circuits. In such a case, it is possible to exclude the effect of the delay of the current detection by applying the above configuration.

Preferably, if there is a DC-DC converter circuit which has not been operated during the past m timing signals (m is an integer which is the number of the plurality of DC-DC converter circuits or more), the control circuit selects the DC-DC converter circuit concerned as a DC-DC converter circuit to be operated next.

This configuration makes it possible to adjust the outputs of the respective DC-DC converter circuits without problems even in such a configuration that the output currents of the plurality of DC-DC converter circuits are not detected in parallel, but only the output current of the operated DC-DC converter circuit is detected.

That is, there are different variations in current detection methods. For example, when the output current is detected by utilizing ON-resistance of the switching element of the high side, the current can be detected in only an ON-period of the switching element concerned. Furthermore, when the current detection is carried out based on the operation of a resonance circuit by a switching converter using a resonance switch, the current detection cannot be carried out unless the resonance switch is turned on. Accordingly, when such current detection methods are applied, the current detection of the DC-DC converter circuit cannot be carried out unless the switching operation of DC-DC converter circuit concerned is carried out. If the switching operation has not been carried out by one DC-DC converter circuit for a long time, only old information on the current detection value of this DC-DC converter circuit remains. Therefore, under such a condition that a DC-DC converter circuit having the output current of a low detection value is preferentially operated, when the detection current of one DC-DC converter circuit is judged to be large and then the outputs of all the DC-DC converter circuits are reduced, there occurs such a situation that the current detection of the one DC-DC converter circuit is not renewed and this state is continued.

However, by applying the above configuration in such a case, it is possible to avoid such a disadvantage that the current detection is not renewed at all times, and to control the outputs of the respective DC-DC converter circuits to be equal to one another.

By adopting such a control system, it is possible to use a current detection circuit which detects an output current of a DC-DC converter circuit operated by the control circuit at a predetermined timing after starting the operation.

By constructing the current detection circuit as described above, the output current of each DC-DC converter circuit can be detected by a common current detection circuit without individually providing a current detection circuit to each of plurality of DC-DC converter circuits. Accordingly, the circuit area can be reduced and the cost can also be reduced. Furthermore, since the degree of freedom of the available current detection method can be increased, there can be used various kinds of useful current detection circuits such as a current detection circuit having a low loss associated with the current detection, a current detection circuit that is not dependent on the temperature and can perform accurate detection, etc.

It is normal that the control circuit operates one of the plurality of DC-DC converter circuits in connection with one of the timing signals. However, when the number of DC-DC converter circuits provided in parallel is large, the embodiment of the present invention can be likewise applied to even if two or three DC-DC converter circuits are simultaneously operated with one timing signal.

The multiphase DC-DC converter is effective in applying switching converters which are operated under pulse frequency modulation control to the plurality of DC-DC converter circuits. Preferably, the switching converters are voltage resonance type or current resonance type switching converters using resonant switches. In such a control system, the timing generating circuit changes frequency of the timing signal based on an output voltage of the multiphase DC-DC converter.

The resonance type switching converter has an advantage that switching loss and switching noise are small. A DC-DC converter having both the effect of the above circuit and the effect of the multiphase system can be provided.

According to the embodiments of the present invention, it is possible to carry out the output operation of the multiphase system in a plurality of DC-DC converter circuits while individually adjusting the outputs of the plurality of DC-DC converter circuits whether the control systems of the respective DC-DC converter circuit are based on PWM or PFM.

The entire disclosure of Japanese Patent Application No. 2006-322824 filed on Nov. 30, 2006 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A multiphase DC-DC converter, comprising:
   a plurality of DC-DC converter circuits connected in parallel to one another;
   an output section to add up outputs of the plurality of DC-DC converter circuits to obtain one output;
   a timing generating circuit to generate timing signals for respectively operating the plurality of DC-DC converter circuits;
   a control circuit to selectively and sequentially operate the plurality of DC-DC converter circuits in synchronization with the timing signals outputted from the timing generating circuit so that output phases of the plurality of DC-DC converter circuits are different from one another; and
   a current detection circuit to detect an output current of each of the plurality of DC-DC converter circuits, wherein
   the control circuit selects one of the plurality of DC-DC converter circuit to be operated next based on an output of the current detection circuit.

2. The multiphase DC-DC converter according to claim 1, wherein the control circuit operates one of the plurality of DC-DC converter circuits in connection with one of the timing signals.

3. The multiphase DC-DC converter according to claim 1, wherein the control circuit selects one of the plurality of DC-DC converter circuits to be operated next so that differences in output currents among the plurality of DC-DC converter circuits are reduced.

4. The multiphase DC-DC converter according to claim 1, wherein the control circuit selects one DC-DC converter circuit having a smallest output current of the plurality of DC-DC converter circuits as a DC-DC converter circuit to be operated next.

5. The multiphase DC-DC converter according to claim 1, wherein the control circuit selects one DC-DC converter circuit having a smallest output current, as a DC-DC converter circuit to be operated next, of the plurality of DC-DC converter circuits except for one or more DC-DC converter circuits which have been operated during the past n timing signals (n is a natural number smaller than the number of the plurality of DC-DC converter circuits).

6. The multiphase DC-DC converter according to claim 4, wherein if there is a DC-DC converter circuit which has not been operated during the past m timing signals (m is an integer which is the number of the plurality of DC-DC converter circuits or more), the control circuit selects the DC-DC converter circuit concerned as a DC-DC converter circuit to be operated next.

7. The multiphase DC-DC converter according to claim 6, wherein the current detection circuit detects an output current of a DC-DC converter circuit operated by the control circuit at a predetermined timing after starting the operation.

8. The multiphase DC-DC converter according to claim 1, wherein the plurality of DC-DC converter circuits are switching converters which are operated under pulse frequency modulation control.

9. The multiphase DC-DC converter according to claim 8, wherein the plurality of DC-DC converter circuits are voltage resonance type or current resonance type switching converters using resonant switches.

10. The multiphase DC-DC converter according to claim 1, wherein the timing generating circuit changes frequency of the timing signal based on an output voltage of the multiphase DC-DC converter.

* * * * *